United States Patent
Lu et al.

(10) Patent No.: US 12,082,270 B2
(45) Date of Patent: Sep. 3, 2024

(54) INFORMATION PROCESSING METHOD, AND FIRST AND SECOND TERMINAL DEVICES

(71) Applicant: GUANGDONG OPPO MOBILE TELECOMMUNICATIONS CORP., LTD., Guangdong (CN)

(72) Inventors: Qianxi Lu, Guangdong (CN); Zhenshan Zhao, Guangdong (CN); Huei-Ming Lin, South Yarra (AU)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 357 days.

(21) Appl. No.: 17/514,436

(22) Filed: Oct. 29, 2021

(65) Prior Publication Data

US 2022/0053580 A1 Feb. 17, 2022

Related U.S. Application Data

(63) Continuation of application No. PCT/CN2019/085338, filed on Apr. 30, 2019.

(51) Int. Cl.
*H04W 76/10* (2018.01)
*H04W 12/50* (2021.01)
*H04W 92/18* (2009.01)

(52) U.S. Cl.
CPC ............ *H04W 76/10* (2018.02); *H04W 12/50* (2021.01); *H04W 92/18* (2013.01)

(58) Field of Classification Search
None
See application file for complete search history.

(56) References Cited

U.S. PATENT DOCUMENTS

| | | | |
|---|---|---|---|
| 9,794,972 B2 | 10/2017 | Lu et al. | |
| 9,888,519 B2 * | 2/2018 | Agiwal | ................. H04W 76/14 |
| 10,149,339 B2 | 12/2018 | Lu et al. | |
| 2008/0176561 A1 | 7/2008 | Shao et al. | |
| 2015/0334756 A1 | 11/2015 | Lu et al. | |
| 2017/0181064 A1 | 6/2017 | Lee et al. | |
| 2017/0245233 A1 | 8/2017 | Jung et al. | |

(Continued)

FOREIGN PATENT DOCUMENTS

| | | |
|---|---|---|
| CN | 102098778 A | 6/2011 |
| CN | 104584670 A | 4/2015 |

(Continued)

OTHER PUBLICATIONS

3rd Generation Partnership Project; "Technical Specification Group Services and System Aspects; Study on Architecture Enhancements to Prose UE-to-Network Relay (Release 15)",3GPP Draft; 23733-030_RM; Feb. 21, 2017 (Feb. 21, 2017 ), XP051240491. 21 pages.

(Continued)

*Primary Examiner* — Adolf Dsouza
(74) *Attorney, Agent, or Firm* — Perkins Coie LLP

(57) ABSTRACT

A method for information processing includes that: a first terminal device sends information to a second electronic device, and the first terminal device starts a first timer, the first terminal device being a terminal device that performs device-to-device communication. A first terminal device and a second terminal device are also provided.

14 Claims, 8 Drawing Sheets

(56) References Cited

U.S. PATENT DOCUMENTS

| | | | |
|---|---|---|---|
| 2017/0374702 | A1 | 12/2017 | Lu et al. |
| 2018/0092017 | A1 | 3/2018 | Freda et al. |
| 2018/0152234 | A1* | 5/2018 | Huang ............... H04B 7/15557 |
| 2018/0192280 | A1 | 7/2018 | Kuge et al. |
| 2018/0288588 | A1 | 10/2018 | Uchiyama |
| 2018/0317221 | A1 | 11/2018 | Yasukawa et al. |

FOREIGN PATENT DOCUMENTS

| | | |
|---|---|---|
| CN | 106211188 A | 12/2016 |
| CN | 108337736 A | 7/2018 |
| CN | 108353406 A | 7/2018 |
| CN | 108605210 A | 9/2018 |
| EP | 3316653 A1 | 5/2018 |
| KR | 20150056075 A | 5/2015 |
| WO | 2018082054 A1 | 5/2018 |

OTHER PUBLICATIONS

3GPP "Technical Specification Group Core Network and Terminals; Proximity-services (ProSe) User Equipment (UE) to Prose function protocol aspects; Stage 3 (Release 15)" 3GPP Standard; 3GPP TS 24.334. vol. CT WG1, No. V15.2.0; Sep. 20, 2018. 264 pages.

Office Action of the Indian application No. 202117051340, issued on Apr. 21, 2022. 6 pages with English translation.

Orange: "Corrections to consolidated Annexes for TS 23.303"3GPP Draft; S2-140696 Editorial Corrections to Consolidated Annexes, 3GPP, vol. SA WG2, No. San Jose Del Caba, Mexico; Feb. 17, 2014-Feb. 21, 2014 Feb. 17, 2014 (Feb. 17, 2014), XP050770253. 23 pages.

Supplementary European Search Report in the European application No. 19926973.9, mailed on Feb. 22, 2022. 13 pages.

Written Opinion of the International Search Authority in the international application No. PCT/CN2019/085338, mailed on Jan. 15, 2020. 10 pages with English translation.

3GPP TSG-RAN WG2 # 104 R2-1816517, Spokane, USA, Nov. 12-16, 2018, Agenda Item: 11.4.2.3, Source: Huawei, HiSilicon, Title: Potential AS layer impacts on SL connection setup and configuration in unicast, Document for: Discussion and decision. p. 1-4. 4 pages.

Second Office Action of the Chinese application No. 201980064932.3, issued on Jun. 16, 2023. 19 pages with English translation.

International Search Report in the international application No. PCT/CN2019/085338, mailed on Jan. 15, 2020.

3GPP TSG RAN Meeting #80 RP-181429, Vodafone, "New SID: Study on NR V2X", La Jolla, USA, Jun. 11-14, 2018.

First Office Action of the Chinese application No. 201980064932.3, issued on Nov. 21, 2022. 24 pages with English translation.

First Office Action of the European application No. 19926973.9, issued on Dec. 7, 2022. 9 pages.

First Office Action of the Chinese application No. 202111370726.0, issued on Jan. 19, 2023. 13 pages with English translation.

Samsung "PC5 unicast", SA WG2 Meeting #132 S2-1903245, Apr. 8-12, 2019. 11 pages.

First Office Action of the Japanese application No. 2021-564549, issued on Apr. 4, 2023. 6 pages with English translation.

Oppo, "Discussion on Sidelink Unicast and Groupcast for NR-V2X", 3GPP TSG-RAN WG2 Meeting #104 R2-1816339, Spokane, US, Nov. 12-16, 2018, the whole document. 5 pages.

Oppo, "Summary of [104#55][NR/V2X] Unicast (Oppo)", 3GPP TSG-RAN WG2 Meeting #105 R2-1900180, Athens, Greece, Feb. 25-Mar. 1, 2019, the whole document. 28 pages.

"3rd Generation Partnership Project; Technical Specification Group Services and System Aspects; Architecture enhancements for 5G System (5GS) to support Vehicle-to-Everything (V2X) services (Release 16)", 3GPP TS 23.287 V0.3.0 (Apr. 2019), the whole document. 40 pages.

First Office Action of the Korean application No. 10-2021-7039061, issued on Oct. 20, 2023. 10 pages with English translation.

Supplementary European Search Report in the European application No. 23197496.5, mailed on Nov. 7, 2023. 14 pages.

* cited by examiner

A network device configures a device-to-device connection situation for a first terminal device — S301

FIG. 5

INFORMATION PROCESSING METHOD, AND FIRST AND SECOND TERMINAL DEVICES

CROSS-REFERENCE TO RELATED APPLICATION

This application is a U.S. continuation application of International Application No. PCT/CN2019/085338, entitled "INFORMATION PROCESSING METHOD AND DEVICE, AND STORAGE MEDIUM", filed on Apr. 30, 2019, the disclosure of which is hereby incorporated by reference in its entirety.

TECHNICAL FIELD

The disclosure relates to the technical field of wireless communications, and more particularly to a method for information processing, a first terminal device and a second terminal device.

BACKGROUND

Unicast connection and multicast connection are introduced in Vehicle to Everything (V2X) of the $5^{th}$ Generation (5G) New Radio (NR) system.

SUMMARY

The aspects of the disclosure provide a method for information processing, a first terminal device and a second terminal device.

In a first aspect, a method for information processing is provided. The method includes that: a first terminal device sends information to a second electronic device, and the first terminal device starts a first timer, the first terminal device being a terminal device that performs device-to-device (D2D) communication.

In a second aspect, a first terminal device is provided. The first terminal device includes a processor and a memory for storing a computer program executable by the processor. The processor is configured to send, through a network interface, information to a second electronic device and start a first timer. The first terminal device is a terminal device that performs device-to-device (D2D) communication.

In a third aspect, a second terminal device is provided. The second terminal device includes a processor and a memory for storing a computer program executable by the processor. The processor is configured to receive, through a network interface, information sent by a first terminal device; sending of the information by the first terminal device triggering a first timer to start timing; and the first terminal device and the second terminal device being terminal devices that perform device-to-device (D2D) communication.

BRIEF DESCRIPTION OF THE DRAWINGS

FIG. 5 is a schematic diagram of an optional processing flow of an information processing method applied to a network device according to an embodiment of the disclosure.

DETAILED DESCRIPTION

In order to understand characteristics and technical contents in the embodiments of the present disclosure in more detail, the implementation of the embodiments of the disclosure is elaborated in combination with the accompanying drawings. The accompanying drawings are only used for reference, but not intended to limit the embodiments of the disclosure.

Unicast connection and multicast connection are introduced in Vehicle to Everything (V2X) of the $5^{th}$ Generation (5G) New Radio (NR) system. However, for how to realize the control between electronic devices, such as the control of a terminal device by a network device, or the control between a first terminal device and a second terminal device, there is no effective solution at present.

Before a detailed description of the embodiments of the disclosure, a brief description of an Internet of Vehicles (IOV) system is given.

The IOV system refers to a Side Link (SL) transmission technology based on Device to Device (D2D) communication. Different from the traditional mode of receiving or sending communication data through a base station in a Long Term Evolution (LTE) system, a D2D direction communication mode is used for the communication data in the IOV system, which has higher spectral efficiency and lower transmission latency.

V2X is standardized in the 3GPP Rel-14, and two transmission modes, namely mode 3 and mode 4, are defined.

Figure 1:
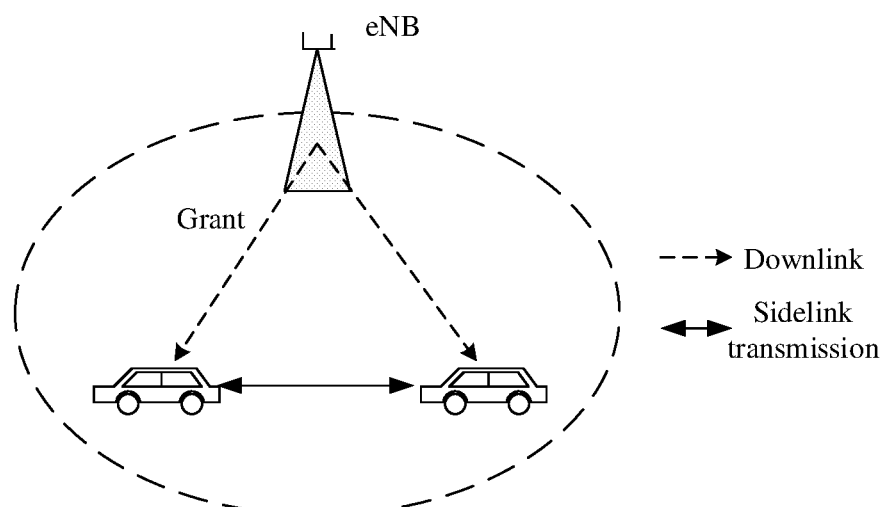
FIG. 1 is a schematic diagram of a data transmission processing flow for mode 3 according to the disclosure.
Figure 2:
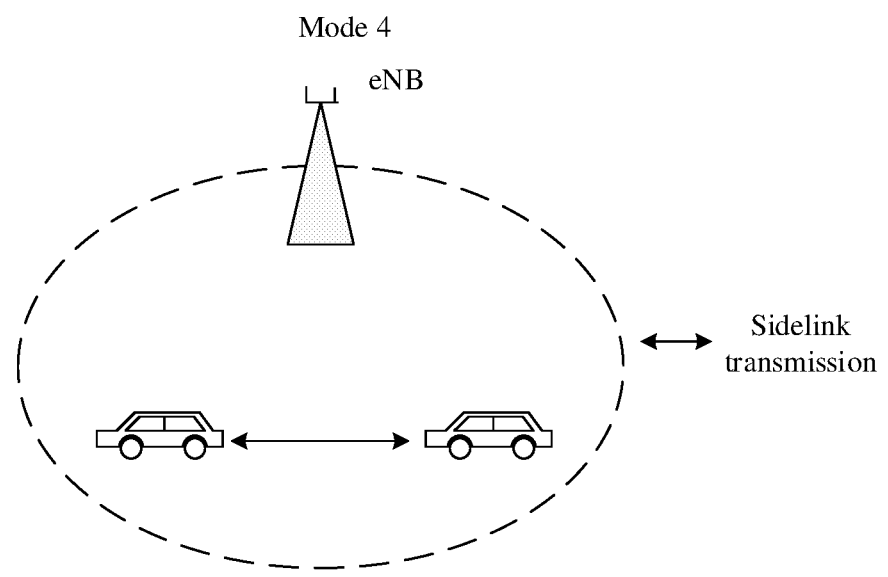
FIG. 2 is a schematic diagram of a data transmission processing flow for mode 4 according to the disclosure.

For the mode 3, a data transmission process is shown in FIG. 1. SL transmission resources of a vehicle-mounted terminal are allocated by the base station, and the vehicle-mounted terminal sends data on the SL according to the resources allocated by the base station. The base station may allocate either resources for single transmission or resources for semi-static transmission.

Figure 4:
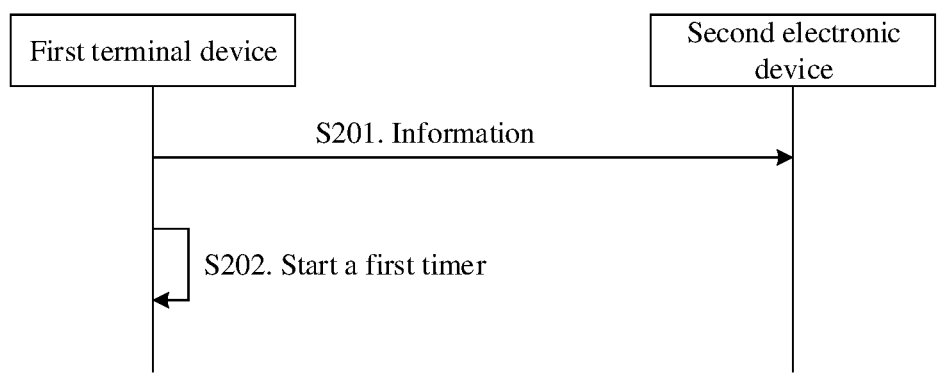
FIG. 4 is a schematic diagram of an optional processing flow of an information processing method applied to a first terminal device according to an embodiment of the disclosure.

For the mode 4, a data transmission process is shown in FIG. 4, the vehicle-mounted terminal adopts the transmission modes of sensing and reservation. The vehicle-mounted terminal obtains a set of available transmission resources by sensing in a resource pool, and randomly selects a resource from the set for SL data transmission. Because a service in the IOV system has a periodicity characteristic, the terminal usually adopts a semi-static transmission mode, that is, after selecting a transmission resource, the terminal consistently uses the resource in multiple transmission cycles, thereby reducing the probability of resource re-selection and resource conflict. The terminal will carry information of reserving a resource for the next transmission in control information of this transmission. In this way, other terminals may determine whether the resource is reserved and used by the terminal by detecting the control information of the terminal, thereby achieving the purpose of reducing resource conflicts.

On one hand, a unicast connection and a multicast connection are introduced in NR-V2X. However, under the unicast connection or the multicast connection, there is no solution for how the network device controls the terminal device to report related information, and how the network device realizes a deep control over the unicast connection or multicast connection of the terminal device. On the other hand, a UE-UE control is introduced in NR-V2X. However, there is no effective solution for the realization of the UE-UE control, such as how to trigger UE-UE capability interaction and mutual control, what granularity is adopted to perform interaction control, how to determine a controlling end and a controlled end, and how to handle abnormal conditions.

Therefore, the disclosure provides a method for information processing. The information processing method of the embodiments of the disclosure may be applied to various communication systems, for example, a Global System of Mobile communication (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD), a Universal Mobile Telecommunication System (UMTS), a Worldwide Interoperability for Microwave Access (WiMAX) communication system or a 5G system.

Figure 3:
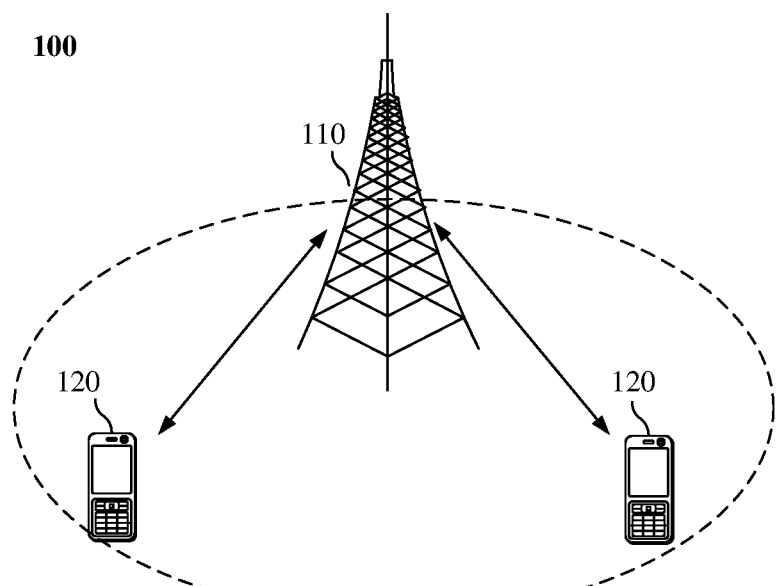
FIG. 3 is a composition structure diagram of a communication system according to an embodiment of the disclosure.

Exemplarily, a communication system 100 that the embodiments of the disclosure are applied to is shown in FIG. 3. The communication system 100 may include a network device 110, and the network device 110 may be a device that communicates with a terminal device 120 (or called a communication terminal and a terminal). The network device 110 may provide communication coverage for a specific geographical area and may communicate with a terminal device located in the coverage. Optionally, the network device 110 may be a Base Transceiver Station (BTS) in the GSM or the CDMA system, a NodeB (NB) in the WCDMA system, an Evolutional Node B (eNB or eNodeB) in the LTE system, or a wireless controller in a Cloud Radio Access Network (CRAN). Or the network device may be a mobile switching center, a relay station, an access point, a vehicle device, a wearable device, a hub, a switch, a network bridge, a router, a network-side device in a 5G network, a network device in a future evolved Public Land Mobile Network (PLMN) or the like.

The communication system 100 further includes at least one terminal device 120 within the coverage of the network device 110. The "terminal device" used herein includes, but is not limited to, a device configured to receive/send a communication signal through a wired line connection, for example, through Public Switched Telephone Network (PSTN), Digital Subscriber Line (DSL), digital cable and direct cable connections, and/or another data connection/network) and/or through a wireless interface, for example, for a cellular network, a Wireless Local Area Network (WLAN), a digital television network like a Digital Video Broadcasting-Handheld (DVB-H) network, a satellite network and an Amplitude Modulated (AM)-Frequency Modulated (FM) broadcast transmitter, and/or another terminal device, and/or an Internet of Things (IoT) device. The terminal device configured to communicate through a wireless interface may be called a "wireless communication terminal", a "wireless terminal" or a "mobile terminal."

Examples of the mobile terminal include, but are not limited to, a satellite or cellular telephone, a Personal Communication System (PCS) terminal capable of combining a cellular radio telephone and data processing, faxing and data communication capabilities, a Personal Digital Assistant (PDA) capable of including a radio telephone, a pager, Internet/intranet access, a Web browser, a notepad, a calendar and/or a Global Positioning System (GPS) receiver, and a conventional laptop and/or palmtop receiver or another electronic device including a radio telephone transceiver. The terminal device may refer to an access terminal, UE, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device, another processing device connected to a wireless modem, a vehicle-mounted device, a wearable device, a terminal device in the 5G network, a terminal device in the future evolved PLMN or the like.

Optionally, Device to Device (D2D) communication may be performed between the terminal devices 120. Optionally, the 5G system or the 5G network may also be called an NR system or an NR network.

A network device and two terminal devices are exemplarily shown in FIG. 3. Optionally, the communication system 100 may include multiple network devices and another number of terminal devices may be included in coverage of each network device. There are no limits made thereto in the embodiments of the disclosure. Optionally, the communication system 100 may further include another network entity such as a network controller and a Mobility Management Entity (MME). No limits are made thereto in the embodiments of the disclosure.

It is to be understood that a device with a communication function in the network/system in the embodiments of the disclosure may be called a communication device. For example, for the communication system 100 shown in FIG. 3, communication devices may include the network device 110 and terminal device 120 with the communication function, and the network device 110 and the terminal device 120 may be the specific devices mentioned above and will not be elaborated herein. The communication devices may further include other devices in the communication system 100, for example, other network entities like a network controller and a mobility management entity. There are no limits made thereto in the embodiments of the disclosure.

As shown in FIG. 4, an optional processing flow of an information processing method that is applied to a first terminal device provided by an embodiment of the disclosure may include the following steps.

At S201, a first terminal device sends information to a second electronic device.

In a first optional embodiment, the second electronic device is a network device. Correspondingly, that the first terminal device sends information to the second electronic device includes that: the first terminal device reports a device-to-device (D2D) connection situation to the network device.

In some embodiments, the D2D connection situation includes: a connection situation between the first terminal device and at least one second terminal device.

The connection situation between the first terminal device and at least one second terminal device incudes that: the first terminal device performs unicast communication with each of the at least one second terminal device, or the first terminal device performs multicast communication with the at least one second terminal device, or the first terminal device performs broadcast communication with the at least one second terminal device.

Optionally, the D2D connection situation also includes: whether a connection between the first terminal device and at least one second terminal device is maintained. When the connection between the first terminal device and at least one second terminal device is maintained, the D2D connection situation also includes: connection quality between the first terminal device and at least one second terminal device. The connection quality includes at least one of the following:

Reference Signal Receiving Power (RSRP) of SL, Reference Signal Receiving Quality (RSRQ) of SL, or Received Signal Strength Indication (RSSI) of SL.

In some other embodiments, the D2D connection situation includes: a Quality of Service (QoS) attribute of the connection between the first terminal device and at least one second terminal device.

In some other embodiments, the D2D connection situation includes: related information of first information, the first information being sent from the second terminal device to the first terminal device. The first information includes at least one of the following: sending parameter information of the second terminal device, receiving parameter information of the second terminal device, sending parameter configuration information of the first terminal device indicated by the second terminal device, receiving parameter configuration information of the first terminal device indicated by the second terminal device, QoS attribute information sent by the second terminal device, or parameter configuration information delivered by a high layer of the second terminal device.

In some embodiments, the first information includes: PLMN information of the second terminal device. Optionally, the PLMN information of the second terminal device includes at least one of a PLMN identifier of the second terminal device or a PLMN category of the second terminal device. The PLMN category includes a same PLMN and a different PLMN. The same PLMN means that the Home PLMN (HPLMN) of the second terminal device is the same as the PLMN of the currently accessed network system. The different PLMN means that the HPLMN of the second terminal device is different from the PLMN of the currently accessed network system.

In an embodiment, the PLMN information of the second terminal device includes at least one of an HPLMN identifier or an HPLMN category of the second terminal device.

The sending parameter information of the second terminal device and/or the receiving parameter information of the second terminal device includes: related parameters of a bearer of the second terminal device. Optionally, the related parameters of a bearer of the second terminal device include at least one of the following: parameters of a Radio Resource Control (RRC) layer, parameters of a Packet Data Convergence Protocol (PDCP) layer, parameters of a Radio Link Control (RLC) layer, parameters of a Media Access Control (MAC) layer, parameters of a Physical (PHY) layer, selection parameters of a Radio Access Technology (RAT), or a selection of a communication mode. The selection of the communication mode includes that: the terminal device independently selects a resource mode and the network device schedules the resource mode of the terminal device. The selection parameters of the RAT include at least one of the following: transmission through an LTE network; transmission through an NR network; transmission through the LTE network or the NR network; or transmission through the LTE network and the NR network.

In the embodiments of the disclosure, the D2D connection situation also includes at least one of a resource usage or power usage of the first terminal device.

In the embodiments of the disclosure, the D2D connection situation also includes at least one of the following: a propagation mode, an identifier of the second terminal device, a PLMN identifier of the second terminal device and/or a PLMN category of the second terminal device, a target address, a source address, a Provider Service Identifier (PSID), an Intelligent Transportation System Application-Identifier (ITS-AID), an access mode, parameter configuration information delivered by the high layer of the first terminal device, a bearer identifier, a logical channel identifier, or a communication mode. The propagation mode includes: unicast, multicast and broadcast. The access mode includes: access in the NR system and access in the LTE system. The communication mode includes that: the terminal device independently selects a resource mode and the network device schedules the resource mode of the terminal device. The PLMN categories of the second terminal device include a same PLMN and a different PLMN. The source address and the target address may not be all address information but are represented using a simplified address index. For example, if the address index is an address of 24 bits in length, an address list reported by the terminal device to a network includes 16 addresses, then the specific address in the address list may be identified by 4 bits instead of 24 bits, so network overhead can be saved.

The first terminal device reports the D2D connection situation to the network device according to different situations. Optionally, the situations include at least one of the following: the propagation mode, the identifier of the second terminal device, the PLMN identifier of the second terminal device and/or the PLMN category of the second terminal device, the target address and/or the source address, the PSID, the ITS-AID, the access mode, the bearer, the logical channel, the channel condition, the speed, the synchronization type, or the communication mode. Optionally, the propagation mode includes: unicast, multicast and broadcast. The channel condition includes a Channel Busy Rate (CBR). The speed is a moving speed of the first terminal device. The access mode is accessing through the LTE system or accessing through the NR system. The communication mode includes that: the terminal device independently selects a resource mode and the network device schedules the resource mode of the terminal device.

Optionally, the D2D connection situation reported by the first terminal device to the network device includes a value obtained after the first terminal device preprocesses the D2D connection situation. The preprocessing includes at least one of the following: a maximum value processing, a minimum value processing, or an average value processing. In specific implementation, at least one of the following may be preprocessed: the propagation mode, the identifier of the second terminal device, the PLMN identifier of the second terminal device and/or the PLMN category of the second terminal device, the target address and/or the source address, the PSID, the ITS-AID, the access mode, the bearer, the logical channel, the channel condition, the speed, the synchronization type, or the communication mode. Taking that the connection situation is the propagation mode and the preprocessing is the average value processing as an example, the propagation mode includes multicast, broadcast and unicast. The value corresponding to multicast is 1, the value corresponding to broadcast is 2, the value corresponding to unicast is 3, and a value obtained by performing the average value processing on the propagation modes is 2. Therefore, the preprocessing refers to performing the maximum value processing, the minimum value processing or the average value processing on different values corresponding to various situations. When the D2D connection situation includes the propagation mode and the access mode, the propagation mode and the access mode are preprocessed respectively. The above is just an example of preprocessing.

In the embodiments of the disclosure, the D2D connection situation also includes: related parameters of a bearer of the first terminal device. Optionally, the related parameters of a bearer of the first terminal device include at least one of the following:

the parameters of the RRC layer, the parameters of the PDCP layer, the parameters of the RLC layer, the parameters of the MAC layer, the parameters of the PHY layer, the selection of the RAT, or the selection of the communication mode. The selection of the communication mode includes that: the terminal device independently selects a resource mode and the network device schedules the resource mode of the terminal device. The selection of the RAT includes at least one of the following: transmission through an LTE network, transmission through an NR network, transmission through the LTE network or the NR network, or transmission through the LTE network and the NR network.

In the specific implementation, the first terminal device transmits an uplink control channel to the network device, and the uplink control channel carries the D2D connection situation. Or, the first terminal device transmits an uplink data channel to the network device, and the uplink data channel carries the D2D connection situation. Or, the first terminal device sends uplink RRC signaling to the network device, and the RRC signaling bears the D2D connection situation. Or, the first terminal device sends a Scheduling Request (SR) to the network device, and the SR carries the D2D connection situation. Or, the first terminal device sends a Buffer Status Report (BSR) to the network device, and the BSR carries the D2D connection situation.

Optionally, when the D2D connection situation is sent from the first terminal device to the network device by transmitting the uplink control channel, the D2D connection situation may be borne through a Physical Uplink Control Channel (PUCCH), and different PUCCH formats may transmit different numbers of bits of information, therefore, the corresponding PUCCH format may be used for bearing different contents included in the D2D connection situation.

Optionally, when the D2D connection situation is sent from the first terminal device to the network device by transmitting the uplink control channel, the first terminal device also receives Downlink Control Information (DCI) sent by the network device. The DCI is used for allocating SL transmission resources for the first terminal device. The DCI carries indication information which is used for determining the transmission resources of the uplink control channel.

For example, the network device sends configuration information to the first terminal device, and the configuration information is used for configuring a transmission resource set of the PUCCH. The network device allocates the SL transmission resources to the first terminal device through the DCI. The DCI may carry the indication information which is used for determining the transmission resources of the PUCCH in combination with the configuration information. Specifically, for example, the indication information includes index information which is used for determining a transmission resource from multiple transmission resources of the PUCCH which are configured by the network. Alternatively, the indication information indicates a time interval between the PUCCH and the DCI, and further, may indicate frequency domain resources of the PUCCH, therefore the transmission resources of the PUCCH for transmitting the D2D connection situation may be determined.

The above description is made by taking that the configuration information is used for configuring the transmission resource set of the PUCCH as an example. In the specific implementation, the configuration information may also be used for configuring a transmission resource set of a Physical Sidelink Share Channel (PSSCH). Specifically, the network device allocates the SL transmission resources to the first terminal device through the DCI. The DCI may carry the indication information which is used for determining the transmission resources of the PSSCH in combination with the configuration information. Specifically, for example, the indication information includes index information which is used for determining a transmission resource from multiple transmission resources of the PSSCH which are configured by the network. Alternatively, the indication information indicates a time interval between the PSSCH and the DCI, and further, may indicate frequency domain resources of the PSSCH, therefore the transmission resources of the PSSCH for transmitting the D2D connection situation may be determined.

In a second optional embodiment, the second electronic device is the second terminal device. Correspondingly, that the first terminal device sends information to the second electronic device is that: the first terminal device sends a first message to the second terminal device, the first message being used for triggering the second terminal device to send a first parameter combination to the first terminal device. The first parameter combination indicates at least one of an SL data sending parameter of the second terminal device or an SL data receiving parameter of the second terminal device. The second terminal device is different from the first terminal device.

In some embodiments, the second terminal device may send the first parameter combination to the first terminal device through a Physical Sidelink Control Channel (PSCCH), or a PSSCH, or a sidelink feedback channel, or a Physical Sidelink Discovery Channel (PSDCH), etc.

In some embodiments, the first parameter combination is transmitted through high layer signaling, that is, the second terminal device sends the first parameter combination to the first terminal device through the high layer signaling. Optionally, the first parameter combination is transmitted through the high layer signaling in a container.

In some other embodiments, the first parameter combination is transmitted through the RRC signaling, that is, the second terminal device sends the first parameter combination to the first terminal device through the RRC signaling.

In the specific implementation, that the second terminal device sends the first parameter combination to the first terminal device may be triggered either by high layer information of the second terminal device or by the first message from the first terminal device. The high layer information is carried in the RRC signaling and is sent simultaneously to the first terminal device with the first parameter combination. The high layer information includes at least one of the following:

a connection establishment request message DIRECT_COMMUNICATION_REQUEST, a security parameter configuration message DIRECT_SECURITY_MOD- E_COMMAND, a security parameter configuration completion message DIRECT_SECURITY_MODE_COMPLETE, or a connection establishment completion message DIRECT_COMMUNICATION_ACCEPT.

In the specific implementation, that the second terminal device sends the first parameter combination to the first terminal device may be triggered by an access layer of the second terminal device. As an example, when at least one of the SL data sending capability of the second terminal device or the SL data receiving capability of the second terminal device changes, the second terminal device triggers the second terminal device to send the first parameter combination to the first terminal device.

It may be understood as that the high layer information of the second terminal device triggers the second terminal device to send the first parameter combination to the first terminal device, or the first terminal device triggers by sending the first message the second terminal device to send the first parameter combination to the first terminal device. Whether the sending of the first parameter combination is triggered by the high layer information of the second terminal device or by the first message of the first terminal device, it may be triggered periodically. That is, the high layer of the second terminal device triggers periodically the second terminal device to send the first parameter combination to the first terminal device, or the first terminal device periodically sends the first message to trigger the second terminal device to send the first parameter combination to the first terminal device.

Here, the first message indicates a type of the first parameter in the first parameter combination that the second terminal device needs to send. For example, the first parameter in the first parameter combination includes different dimensions, such as the QoS attribute, the propagation mode, the identifier of the second terminal device, the target address, the source address, the PSID, the ITS-AID, the RAT, and the parameter configuration information delivered by the high layer of the second terminal device. Optionally, the type of the first parameter in the embodiments of the disclosure refers to different dimensions of the first parameter. The propagation mode includes unicast, multicast and broadcast. The RAT includes accessing in the NR system and accessing in the LTE system.

The first message also indicates at least one of the SL data sending parameter of the first terminal device or the SL data receiving parameter of the first terminal device. Optionally, the SL data sending parameter that the second terminal needs to send indicated by the first message is a sending parameter compatible with the receiving parameter of the first terminal. The SL data receiving parameter that the second terminal needs to send indicated by the first message is a receiving parameter compatible with the sending parameter of the first terminal. Optionally, besides indicating that the SL data receiving parameter required to be sent by the second terminal is the receiving parameter compatible with the sending parameter of the first terminal, the first message also indicates that the second terminal device is ready to send the first parameter combination within the first time duration.

The first message is a PC5-signaling message, or the first message is an RRC message, or the first message is a connection establishment request message, or the first message is a security parameter configuration message, or the first message is a security parameter configuration completion acknowledgment message, or the first message is a connection establishment completion acknowledgment message.

In some embodiments, when the second terminal device is triggered by the first message sent by the first terminal device to send the first parameter combination to the first terminal device, the method may further include the following operation.

The first parameter in the first parameter combination sent to the first terminal device by the second terminal device is configured for different situations. The first parameter includes the SL data sending parameter of the second terminal device, or the first parameter includes the SL data receiving parameter of the second terminal device, or the first parameter includes the SL data sending parameter and the SL data receiving parameter of the second terminal device.

The situation include at least one of the following: the QoS attribute, the propagation mode, the identifier of the second terminal device, the target address, the source address, the PSID, the ITS-AID, the RAT, or the parameter configuration information delivered by the high layer of the second terminal device.

When the first parameter combination includes the QoS attribute, the first parameter combination indicates that the second terminal device requires initiating a service with the QoS attribute. Or, when the first parameter combination includes the QoS attribute, the first parameter combination indicates that the second terminal device requires releasing the service with the QoS attribute.

Therefore, in the embodiments of the disclosure, at least one of the SL data sending parameter or receiving parameter of the second terminal device is configured based on one or more of the propagation mode, the identifier of the second terminal device, the target address, the PSI, and the ITS-AID.

In the embodiments of the disclosure, the first parameter combination includes at least one of the following: a sending resource of the second terminal device, a receiving resource of the second terminal device, related information of a sending resource pool of the second terminal device, related information of a receiving resource pool of the second terminal device, or related information of a transmission power of the second terminal device.

Optionally, the first parameter combination also includes at least one of the following: the QoS attribute, the propagation mode, the identifier of the second terminal device, the target address, the source address, the PSID, the ITS-AID, the RAT, or the parameter configuration information delivered by the high layer of the second terminal device. The propagation mode includes unicast, multicast and broadcast. The RAT includes accessing in the NR system and accessing in the LTE system.

In some embodiments, the SL data receiving parameter of the second terminal device includes at least one of the following: the RSRP of SL of the second terminal device, the RSRQ of SL of the second terminal device, or the RSSI of SL of the second terminal device.

The SL of the second terminal device includes at least one of: an SL between the second terminal device and the first terminal device, or an SL between the second terminal device and a third terminal device. The first terminal device is different from the third terminal device.

In the embodiments of the disclosure, the first parameter combination is determined by the second terminal device according to an existing service, or the first parameter combination is determined by the second terminal device according to a newly occurring service.

In a third optional embodiment, the second electronic device is a second terminal device, and the message is the second parameter combination. Correspondingly, that the first terminal device sends the message to the second terminal device includes that: the first terminal device sends the second parameter combination to the second terminal device. Optionally, the information also indicates that the second terminal device needs to be ready to send a third message within a second time duration. The third message represents that at least one of the SL data sending parameter of the second terminal device or the SL data receiving parameter of the second terminal device is configured successfully, or the third message represents that it is failed to configure at least one of the SL data sending parameter of the second terminal device or the SL data receiving parameter of the second terminal device. The second time duration is related to at least one of a connection state or coverage state of the second terminal device. Here, the second time duration is different for scenarios where the second terminal is in an RRC connection state, an idle state and/or in/outside network coverage. In the specific implementation, the second parameter combination may be sent using resource authorization.

In the embodiments of the disclosure, the second parameter combination indicates the SL data sending parameter of the second terminal device, or the second parameter combination indicates the SL data receiving parameter of the second terminal device, or the second parameter combination indicates the SL data sending parameter and receiving parameter of the second terminal device. The second terminal device is different from the first terminal device.

In some embodiments, the first terminal device may send the second parameter combination to the second terminal device through the PSCCH, or the PSSCH, or the sidelink feedback channel, or the PSDCH, etc.

In some embodiments, the second parameter combination is transmitted through the high layer signaling, that is, the first terminal device sends the second parameter combination to the second terminal device through the high layer signaling. Optionally, the second parameter combination is transmitted through the high layer signaling in a container.

In some other embodiments, the second parameter combination is transmitted through the RRC signaling, that is, the first terminal device sends the second parameter combination to the second terminal device through the RRC signaling.

In the specific implementation, that the first terminal device sends the second parameter combination to the second terminal device may be triggered either by the high layer information of the first terminal device or by the second message from the second terminal device. The high layer message is carried in the RRC signaling and is sent simultaneously to the second terminal device with the second parameter combination. The high layer message includes at least one of the following: the connection establishment request message, the security parameter configuration message, the security parameter configuration completion message, or the connection establishment completion message.

In some other embodiments, the first terminal device may be triggered by the access layer of the first terminal device to send the second parameter combination to the second terminal device.

In the specific implementation, the first terminal device receives a fifth parameter combination sent by the second terminal device, the fifth parameter combination indicating at least one of the SL data sending parameter of the first terminal device or the SL data receiving parameter of the second terminal device; and the first terminal device configures the fifth parameter combination. When the first terminal device configures the fifth parameter combination successfully, the first terminal device is triggered to send the second parameter combination to the second terminal device. It may be understood that the first terminal device configures the fifth parameter combination successfully includes that the access layer of the first terminal device triggers the first terminal device to send the second parameter combination to the second terminal device.

It may be understood that the high layer of the first terminal device triggers the first terminal device to send the second parameter combination to the second terminal device, or the second message from the second terminal device triggers the first terminal device to send the second parameter combination to the second terminal device. Whether the sending of the second parameter combination is triggered by the high layer of the first terminal device or by the second message from the second terminal device, it may be triggered periodically. That is, the high layer of the first terminal device triggers periodically the first terminal device to send the second parameter combination to the second terminal device, or the second terminal device periodically sends the second message to the first terminal device, so as to trigger the first terminal device to send the second parameter combination to the second terminal device.

Here, the second message is the PC5-signaling message, or the second message is the RRC message, or the second message is the connection establishment request message, or the second message is the security parameter configuration message, or the second message is the security parameter configuration completion acknowledgment message, or the second message is the connection establishment completion acknowledgment message.

The second parameter in the second parameter combination sent to the second terminal device by the first terminal device is configured for different situations. The second parameter includes the SL data sending parameter of the second terminal device, or the second parameter includes the SL data receiving parameter of the second terminal device, or the second parameter includes the SL data sending parameter and the SL data receiving parameter of the second terminal device.

The situations include at least one of the following: the QoS attribute, the propagation mode, the identifier of the second terminal device, the target address, the source address, the PSID, the ITS-AID, the RAT, or the parameter configuration information delivered by the high layer of the second terminal device.

Therefore, in the embodiments of the disclosure, at least one of the SL data sending parameter or receiving parameter of the second terminal device is configured based on one or more of the propagation mode, the identifier of the second terminal device, the target address, the PSI, and the ITS-AID.

In the embodiments of the disclosure, the second parameter combination includes at least one of the following: the sending resource of the second terminal device, the receiving resource of the second terminal device, the related information of the sending resource pool of the second terminal device, the related information of the receiving resource pool of the second terminal device, or the related information of the transmission power of the second terminal device.

In some embodiments, the description of the second parameter combination is the same as the first parameter combination and will not be repeated here. The description of the SL of the second terminal device is the same as the SL of the second terminal device involved in the embodiments of the disclosure and will not be repeated here.

In a third embodiment, based on S201, the method may also include the following operation.

The first terminal device receives a third message sent by the second terminal device.

In the embodiments of the disclosure, the third message indicates that the second terminal device completes the configuration of the second parameter combination, or the third message indicates that the second terminal device refuses to configure the second parameter combination or fails to configure the second parameter combination.

When the third message indicates that the second terminal device fails to configure the second parameter combination, the third message indicates a third parameter combination selected by the second terminal device, or the third message indicates a fourth parameter combination being used by the second terminal device, or the third message indicates that the second terminal device requires an SL connection with the first terminal device to be reestablished.

In an optional embodiment, before sending the third message, the second terminal device uses the configuration prior to the second parameter combination. Or, before sending the third message, the second terminal device stops at least one radio bearer.

The third parameter combination selected by the second terminal device refers to the third parameter combination provided by the second terminal device or the third parameter combination suggested by the second terminal device.

In some embodiments, the method may further include the following operation.

The first terminal device receives a sixth parameter combination sent by the second terminal device. The sixth parameter combination indicates at least one of the following: the SL data sending parameter of the first terminal device, or the SL data receiving parameter of the first terminal device.

The sixth parameter combination and the third message are transmitted through the same RRC message.

In some embodiments, the information included in the third parameter combination and the fourth parameter combination is the same as the information included in the first parameter combination, and will not be repeated here.

At S202, the first terminal device starts a first timer.

In a first embodiment, when the first terminal device receives the D2D connection situation that is configured for the first terminal device by the network device, the first timer ends.

In some embodiments, when the first timer expires, the first terminal device sends a fourth message to an upper layer of the first terminal device. The fourth message indicates a connection failure. Here, the connection failure refers to that the connection between the first terminal device and the network device fails. Correspondingly, when the first timer has not expired, the first terminal device does not send the fourth message to the upper layer.

In some other embodiments, when the first timer expires, the first terminal device sends a fifth message to at least one second terminal device. The fifth message indicates a connection failure. Correspondingly, when the first timer has not expired, the first terminal device does not send a fifth message to any second terminal device.

In some other embodiments, when the first timer expires, the first terminal device triggers a connection re-establishment process. Correspondingly, when the first timer has not expired, the first terminal device does not trigger the connection re-establishment process.

The connection failure includes at least one of the following: connection establishment failure, connection configuration failure, failure of obtaining network configuration for the connection, connection release failure, or link failure.

In some other embodiments, when the first timer has not expired, the first terminal device cannot report the D2D connection situation to the network device. In the specific implementation, the first terminal device sends information to the network device and starts the first timer. When the first timer has not expired, the first terminal device cannot report any D2D connection situation to the network device. Here, the D2D connection situation that cannot be reported includes a D2D connection situation which is the same as or different from the D2D connection situation that has been reported to the network device.

In the second optional embodiment, during the specific implementation, when the first terminal device receives the first parameter combination sent by the second terminal device, the first timer expires.

In some embodiments, when the first timer expires, the method may further include the following operation.

The first terminal device sends a sixth message to the upper layer of the first terminal device. The sixth message indicates a connection failure. Here, the connection failure refers to that the connection between the first terminal device and the second terminal device fails. Correspondingly, when the first timer has not expired, the first terminal device does not send the sixth message to the upper layer of the first terminal device.

In some other embodiments, when the first timer expires, the method may further include that: the first terminal device sends a seventh message to the second terminal device. The seventh message indicates a connection failure. Here, the connection failure refers to the failure of the connection between the first terminal device and the second terminal device. Correspondingly, when the first timer has not expired, the first terminal device does not send a seventh message to the first terminal device.

When the first timer expires, the method may further include that: the first terminal device triggers the connection re-establishment process.

Under some other circumstances that the first timer has not expired, the first terminal device no longer sends the first message to the second terminal device. It may be understood as that within the duration of the first timer, the first terminal device sends the first message to the second terminal only once.

In the third optional embodiment, when the first terminal device receives the third message sent by the second terminal device, the first timer ends.

In some embodiments, when the first timer expires, the first terminal device sends an eighth message to the upper layer of the first terminal device. The eighth message indicates a connection failure. Here, the connection failure refers to the failure of the connection between the first terminal device and the second terminal device. Correspondingly, when the first timer has not expired, the first terminal device does not send the eighth message to the upper layer of the first terminal device.

In some other embodiments, when the first timer expires, the first terminal device sends a ninth message to at least one second terminal device. The ninth message indicates a connection failure. Here, the connection failure refers to the failure of the connection between the first terminal device and the second terminal device. Correspondingly, when the first timer has not expired, the first terminal device does not send the ninth message to any second terminal device.

In some other embodiments, when the first timer expires, the first terminal device triggers the connection re-establishment process. Correspondingly, when the first timer has not expired, the first terminal device does not trigger the connection re-establishment process. The connection failure includes at least one of the following: the connection establishment failure, the connection configuration failure, the failure of obtaining network configuration for the connection, the connection release failure, or the link failure.

In some embodiments, when the first timer has not expired, the first terminal device no longer sends the second parameter combination to the second terminal device, that is, within the duration of the first timer, the first terminal device sends the second parameter combination to the second terminal only once.

In the information processing method provided by the embodiments of the disclosure, the network device configures the D2D connection situation for the first terminal device, and the first terminal device reports the D2D connection situation to the network device, thereby realizing the control by the network device over a unicast or multicast connection of the terminal device. By sending a message to the second terminal device, the first terminal device triggers the second terminal device to send a first parameter combination to it, or the first terminal device sends a second parameter combination to the second terminal device, both the first parameter combination and the second parameter combination indicating a Side Link (SL) data sending parameter of the second terminal device and/or an SL data receiving parameter of the second terminal device. In this way, both the first terminal device and the second terminal device are informed of the SL data sending parameter of the second terminal device and/or the SL data receiving parameter of the second terminal device, thereby realizing the control from the terminal device to the terminal device.

As shown in FIG. 5, an optional processing flow of an information processing method that is applied to a network device provided by an embodiment of the disclosure may include the following steps.

At S301, the network device configures a device-to-device (D2D) connection situation for a first terminal device.

In some embodiments, the D2D connection situation includes: a connection situation between the first terminal device and at least one second terminal device.

The connection situation between the first terminal device and at least one second terminal device includes that: the first terminal device performs unicast communication with each of the at least one second terminal device, or the first terminal device performs multicast communication with the at least one second terminal device, or the first terminal device performs broadcast communication with the at least one second terminal device.

Optionally, the D2D connection situation also includes: whether a connection between the first terminal device and a second terminal device is established and/or released.

In some other embodiments, the D2D connection situation includes: a QoS attribute of the connection between the first terminal device and at least one second terminal device.

In some other embodiments, the D2D connection situation includes: related information of second information. The second information is sent from the first terminal device to the at least one second terminal device. The second information indicates at least one of the following: sending parameter configuration information of the second terminal device, or the receiving parameter configuration information of the second terminal device.

In an optional embodiment, the D2D connection situation includes at least one of a resource usage of the first terminal device or a power usage of the first terminal device.

In an optional embodiment, the D2D connection situation includes: related configuration of a bearer of the first terminal device. Optionally, the related configuration of the bearer of the first terminal device includes at least one of the following: a configuration of a RRC layer, a configuration of a PDCP layer, a configuration of a RLC layer, a configuration of a MAC layer; a configuration of a PHY layer, a selection of a RAT, or a selection of the communication mode. The selection of the RAT includes at least one of the following: transmission through a LTE network; transmission through a NR network; transmission through the LTE network or the NR network; or, transmission through the LTE network and the NR network.

In an optional embodiment, the D2D connection situation includes: whether the first terminal device accepts a sending parameter configuration and/or receiving parameter configuration of the first terminal device sent by the second terminal device. In an optional embodiment, the D2D connection situation includes: whether the first terminal device accepts a connection establishment request from the second terminal device.

In an optional embodiment, the D2D connection situation also includes: a propagation mode, an identifier of the second terminal device, a PLMN identifier of the second terminal device and/or a PLMN category of the second terminal device, a target address, a source address, a PSID, a ITS-AID, an access mode, parameter configuration information delivered by the high layer of the first terminal device, a bearer identifier, a logical channel identifier, or a communication mode. The propagation mode includes: unicast, multicast and broadcast. The access mode includes: access in the NR system and access in the LTE system. The communication mode includes that: the terminal device independently selects a resource mode and the network device schedules the resource mode of the terminal device.

In the embodiments of the disclosure, the D2D connection situation is configured separately according to different situations. The situations include at least one of the following: the propagation mode, the identifier of the second terminal device, the PLMN identifier of the second terminal device and/or the PLMN category of the second terminal device, the target address and/or the source address, the PSID, the ITS-AID, the access mode, the bearer, the logical channel, the channel condition, a speed, a synchronization type, or the communication mode. Taking the speed as an example, based on different speeds of the first terminal device, the network device configures different D2D connection situations for the first terminal device. Taking the propagation mode as an example, based on different propagation modes, such as multicast, broadcast, and unicast, the network device configures different D2D connection situations for the first terminal device.

Optionally, the D2D connection situation also includes a first default configuration. That is, there are two configurations for each situation, one of which is that the D2D connection situation is configured according to the different situations, and the other is the first default configuration. When a first condition is met, parameters are configured according to the first default configuration. The first condition includes that the parameters cannot be configured according to the configuration of different situations. For example, there are three parameter configurations based on the channel condition, the speed, and the access mode, but a first mobile terminal can perform two of the three parameter configurations at present. In this case, the first terminal device configures the parameters according to the first default configuration. Optionally, when there are three parameter configurations for different situations, the parameters are configured in order of priorities of the three configurations.

In the specific implementation, the parameter configuration is implemented through at least one of dedicated RRC signaling, broadcast RRC signaling, or pre-configuration information.

Figure 6:
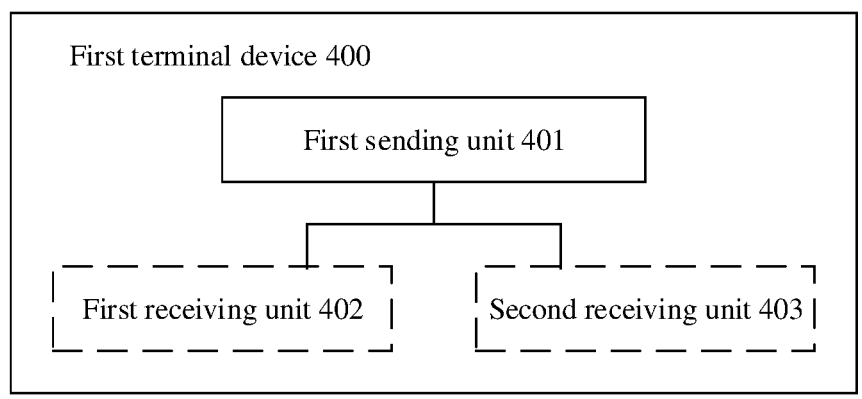
FIG. 6 is a composition structure diagram of a first terminal device according to an embodiment of the disclosure.

Based on the information processing method, the embodiments of the disclosure also provide a first terminal device. The composition structure diagram of the first terminal device 400 is shown in FIG. 6. The first terminal device includes a first sending unit 401.

The first sending unit 401 is configured to send information to the second electronic device and start the first timer. The first terminal device is a terminal device that performs device-to-device (D2D) communication.

In the first embodiment, the first sending unit is configured to report a D2D connection situation to the network device.

In some embodiments, the D2D connection situation includes: a connection situation between the first terminal device and at least one second terminal device. The first terminal device performs unicast communication with each of the at least one second terminal device, or the first terminal device performs multicast communication with the at least one second terminal device, or the first terminal device performs broadcast communication with the at least one second terminal device.

Here, the D2D connection situation includes: whether the connection between the first terminal device and at least one second terminal device is maintained. When the connection between the first terminal device and at least one second terminal device is maintained, the D2D connection situation includes: a connection quality between the first terminal device and the at least one second terminal device. The connection quality includes at least one of the following: RSRP, RSRQ or RSSI of the SL.

In some other embodiments, the D2D connection situation includes: a QoS attribute of the connection between the first terminal device and the at least one second terminal device.

In some other embodiments, the D2D connection situation includes: related information of first information, the first information being sent from the second terminal device to the first terminal device.

The first information includes at least one of the following: a sending parameter information of the second terminal device, a receiving parameter information of the second terminal device, a sending parameter configuration information indicating the first terminal device and sent by the second terminal device, a receiving parameter configuration information indicating the first terminal device and sent by the second terminal device, a QoS attribute information sent by the second terminal device, or parameter configuration information delivered by a high layer of the second terminal device.

In the embodiments of the disclosure, the D2D connection situation includes at least one of a resource usage of the first terminal device or a power usage of the first terminal device.

In the specific implementation, when the first terminal device receives the D2D connection situation that is configured for the first terminal device by the network device, the first timer ends.

In the embodiments of the disclosure, when the first timer expires, the first sending unit 401 is further configured to send a fourth message to an upper layer of the first terminal device. The fourth message indicates a connection failure.

In the embodiments of the disclosure, when the first timer expires, the first sending unit 401 is further configured to send a fifth message to at least one second terminal device. The fifth message indicates a connection failure.

In the embodiments of the disclosure, the first sending unit 401 is further configured to trigger a connection re-establishment process when the first timer expires.

In the embodiments of the disclosure, when the first timer has not expired, the first sending unit 401 is further configured to no longer send the D2D connection situation to the network device.

In the embodiments of the disclosure, the D2D connection situation also includes: a propagation mode, an identifier of the second terminal device, a PLMN identifier of the second terminal device and/or a PLMN category of the second terminal device, a target address, a source address, a PSID, a ITS-AID, a access mode, parameter configuration information delivered by a high layer of the first terminal device, or a communication mode. The propagation mode includes: unicast, multicast and broadcast. The access mode includes: access in the NR system and access in the LTE system. The communication mode includes that: the terminal device independently selects a resource mode and the network device schedules the resource mode of the terminal device.

In the second embodiment, the second electronic device is the second terminal device. The first sending unit 401 is configured to send the first message to the second terminal device, the first message being used for triggering the second terminal device to send a first parameter combination to the first terminal device. The first parameter combination indicates an SL data sending parameter of the second terminal device and/or an SL data receiving parameter of the second terminal device.

In the embodiments of the disclosure, the first parameter combination is transmitted through high layer signaling. Optionally, the first parameter combination is transmitted through the high layer signaling in a container.

In the embodiments of the disclosure, the first message indicates a type of a first parameter in the first parameter combination that the second terminal device needs to send.

In the embodiments of the disclosure, the first message indicates at least one of the following: an SL data sending parameter of the first terminal device, or an SL data receiving parameter of the first terminal device.

In the embodiments of the disclosure, the first message is any one of the following: a PC5-signaling message, a RRC message, a connection establishment request message, a security parameter configuration message, a security parameter configuration completion acknowledgment message, or a connection establishment completion acknowledgment message.

In the embodiments of the disclosure, when the first terminal device receives the first parameter combination sent by the second terminal device, the first timer ends.

In the embodiments of the disclosure, when the first timer expires, the first sending unit 401 is further configured to send a sixth message to the upper layer of the first terminal device. The sixth message indicates a connection failure.

In the embodiments of the disclosure, the first sending unit 401 is further configured to send a seventh message to the second terminal device. The seventh message indicates a connection failure.

In the embodiments of the disclosure, the first terminal device further includes: a first sending unit, configured to trigger a connection re-establishment process.

In the embodiments of the disclosure, when the first timer has not expired, the first sending unit 401 is configured to no longer send the first message to the second terminal device. The first message indicates that the second terminal device is ready to send the first parameter combination within the first time duration.

In the embodiments of the disclosure, the first parameter combination is used for configuring the first parameter for different situations.

The situations include at least one of the following: a QoS attribute, the propagation mode, the identifier of the second terminal device, the target address, the source address, the PSID, the ITS-AID, the RAT, or the parameter configuration information delivered by the high layer of the second terminal device.

In the embodiments of the disclosure, the first parameter combination includes at least one of the following: a sending resource of the second terminal device, a receiving resource of the second terminal device, related information of a sending resource pool of the second terminal device, related information of a receiving resource pool of the second terminal device, or related information of transmission power of the second terminal device.

In the embodiments of the disclosure, the first parameter combination includes at least one of the following:

the QoS attribute, the propagation mode, the identifier of the second terminal device, the target address, the source address, the PSID, the ITS-AID, the RAT, or the parameter configuration information delivered by the high layer of the second terminal device.

In the embodiments of the disclosure, when the first parameter combination includes the QoS attribute, the first parameter combination indicates that the second terminal device requires initiating a service with the QoS attribute.

In the embodiments of the disclosure, when the first parameter combination includes the QoS attribute, the first parameter combination indicates that the second terminal device requires releasing the service with the QoS attribute.

In the embodiments of the disclosure, the first parameter combination is determined by the second terminal device according to a existing service, and/or the first parameter combination is determined by the second terminal device according to a newly occurring service.

In the third embodiment, the second electronic device is the second terminal device. The first sending unit 401 is configured to send a second parameter combination to the second terminal device. The second parameter combination indicates the SL data sending parameter of the second terminal device and/or the SL data receiving parameter of the second terminal device.

In some embodiments, the second parameter combination is transmitted through high layer signaling. Optionally, the second parameter combination is transmitted through the high layer signaling in a container.

In some embodiments, the second parameter combination is transmitted through RRC signaling.

In some embodiments, that the first sending unit 401 sends the second parameter combination to the second terminal device is triggered by the high layer of the first terminal device.

In some embodiments, that the first sending unit 401 sends the second parameter combination to the second terminal device is triggered by at least one of the following high layer messages: the connection establishment request message, the security parameter configuration message, the security parameter configuration completion message, or the connection establishment completion message.

In some embodiments, the high layer message is carried in the RRC signaling and is sent simultaneously to the second terminal device with the second parameter combination.

In some embodiments, that the first sending unit 401 sends the second parameter combination to the second terminal device is triggered by an access layer of the first terminal device.

In some embodiments, the first sending unit 401 is configured to receive a fifth parameter combination sent by the second terminal device. The fifth parameter combination indicates the SL data sending parameter of the first terminal device and/or the SL data receiving parameter of the second terminal device. The fifth parameter combination is configured successfully.

In some embodiments, that the first sending unit 401 sends the second parameter combination to the second terminal device is triggered by a second message from the second terminal device.

In some embodiments, the second message includes any of the following: the PC5-signaling message, the RRC message, the connection establishment request message, the security parameter configuration message, the security parameter configuration completion acknowledgment message, or the connection establishment completion acknowledgment message.

The second parameter combination is used for configuring a second parameter for different situations. The second parameter include the SL data sending parameter of the second terminal device and/or the SL data receiving parameter of the second terminal device. The situations include at least one of the following:

the QoS attribute, the propagation mode, the identifier of the second terminal device, the target address, the source address, the PSID, the ITS-AID, the RAT, or the parameter configuration information delivered by the high layer of the second terminal device.

In some embodiments, the first terminal device further includes: a first receiving unit 402, configured to receive a third message sent by the second terminal device.

Optionally, the third message indicates that the second terminal device completes the configuration of the second parameter combination.

In some embodiments, the first terminal device further includes a second receiving unit 403. The second receiving unit is configured to receive a sixth parameter combination sent by the second terminal device. The sixth parameter combination indicates at least one of the following: the SL data sending parameter of the first terminal device, or the SL data receiving parameter of the first terminal device. Optionally, the sixth parameter combination and the third message are transmitted through the same RRC message.

In some embodiments, the third message indicates that the second terminal device refuses to configure the second parameter combination or fails to configure the second parameter combination.

In some embodiments, the third message indicates any one of the following: a third parameter combination selected by the second terminal device, a fourth parameter combination being used by the second terminal device, or the second terminal device requires a side connection with the first terminal device to be reestablished.

In some embodiments, before sending the third message, the second terminal device uses configuration prior to the second parameter combination.

In some embodiments, before sending the third message, the second terminal device stops at least one radio bearer.

In some embodiments, when the first terminal device receives the third message sent by the second terminal device, the first timer ends.

In some embodiments, when the first timer expires, the first sending unit is configured to send an eighth message to the upper layer of the first terminal device. The eighth message indicates a connection failure.

In some embodiments, when the first timer expires, the first sending unit 401 is configured to send a ninth message to the upper layer of the first terminal device. The ninth message indicates a connection failure.

In some embodiments, the first sending unit 401 is further configured to trigger the connection re-establishment process when the first timer expires.

In some embodiments, when the first timer has not expired, the first sending unit no longer sends the second parameter combination to the second terminal device.

In some embodiments, the information indicates that the second terminal device is ready to send the first parameter combination within a second time duration. The second time duration is related to the connection state and/or coverage state of the second terminal device.

Figure 7:
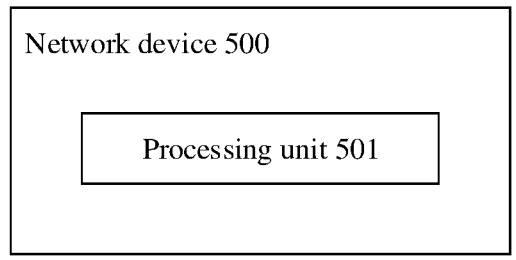
FIG. 7 is a composition structure diagram of a network device according to an embodiment of the disclosure.

Based on the information processing method, the embodiments of the disclosure also provide a network device. The composition structure diagram of the network device 500 is shown in FIG. 7. The network device includes a processing unit 501.

The processing unit 501 is configured to configure a device-to-device (D2D) connection situation for a first terminal device.

In some embodiments, the D2D connection situation includes: a connection situation between the first terminal device and at least one second terminal device. The first terminal device performs unicast communication with each of the at least one the second terminal device, or the first terminal device performs multicast communication with the at least one second terminal device, or the first terminal device performs broadcast communication with the at least one second terminal device.

In some other embodiments, the D2D connection situation includes: whether the connection between the first terminal device and at least one second terminal device is established and/or released.

In some other embodiments, the D2D connection situation includes: a QoS attribute of the first terminal device and a QoS attribute of at least one second terminal device.

In some other embodiments, the D2D connection situation includes: related information of second information, the second information being sent from the first terminal device to the second terminal device. The second information includes at least one of the following: sending parameter configuration information of the second terminal device, or receiving parameter configuration information of the second terminal device.

In an optional embodiment, the D2D connection situation includes at least one of a resource usage of the first terminal device or a power usage of the first terminal device.

In an optional embodiment, the D2D connection situation includes: whether the first terminal device accepts a sending parameter configuration and/or receiving parameter configuration of the first terminal device sent by the second terminal device.

In an optional embodiment, the D2D connection situation includes: whether the first terminal device accepts a connection establishment request from the second terminal device.

In an optional embodiment, the D2D connection situation includes: whether the first terminal device accepts a sending parameter configuration and/or receiving parameter configuration of the first terminal device sent by the second terminal device.

In an optional embodiment, the D2D connection situation includes at least one of the resource usage of the first terminal device or the power usage of the first terminal device.

In an optional embodiment, the D2D connection situation includes: the related configuration of the bearer of the first terminal device.

In an optional embodiment, the D2D connection situation includes at least one of the following: a configuration of a RRC layer, a configuration of a PDCP layer, a configuration of a RLC layer, a configuration of a MAC layer, a configuration of a PHY layer, a selection of a RAT, or a selection of a communication mode. The selection of the RAT includes at least one of the following: transmission through a LTE network, transmission through a NR network, transmission through the LTE network or the NR network, or transmission through the LTE network or the NR network.

In an optional embodiment, the D2D connection situation includes: the QoS attribute of the first terminal device or the QoS attribute of at least one second terminal device.

In an optional embodiment, the D2D connection situation includes: the related information of second information, the second information being sent from the first terminal device to the second terminal device. The second information includes at least one of the following: the sending parameter configuration information of the second terminal device, or the receiving parameter configuration information of the second terminal device.

In an optional embodiment, the D2D connection situation also includes: a propagation mode, an identifier of the second terminal device, a PLMN identifier of the second terminal device and/or a PLMN category of the second terminal device, a target address, a source address, a PSID, a ITS-AID, a access mode, parameter configuration information delivered by a high layer of the first terminal device, a bearer identifier, a logical channel identifier, or a communication mode. The propagation mode includes: unicast, multicast and broadcast. The access mode includes: access in the NR system and access in the LTE system. Optionally, the communication mode includes that: the terminal device independently selects a resource mode and the network device schedules the resource mode of the terminal device.

In an optional embodiment, the D2D connection situation is configured according to different situations. The situations include at least one of the following:

a propagation mode, an identifier of the second terminal device, a PLMN identifier of the second terminal device and/or a PLMN category of the second terminal device, a target address and/or a source address, a PSID, a ITS-AID, a access mode, a bearer, a logical channel, a channel condition, a speed, a synchronization type or a communication mode.

In an optional embodiment, the D2D connection situation includes a first default configuration. When a first condition is met, the parameters are configured according to the first default configuration. The first condition includes that the parameters cannot be configured according to the configurations of different situations.

In an optional embodiment, for the different situations, the parameters are configured in order of priorities of configurations for the different situations.

In an optional embodiment, the configuration is implemented through at least one of the following: dedicated RRC signaling, broadcast RRC signaling, or pre-configuration information.

The embodiments of the disclosure also provide a terminal device, which may include: a processor and a memory configured to store a computer program executable by the processor. The processor is configured to run the computer program to execute the steps in the information processing method executed by the terminal device.

The embodiments of the disclosure also provide a network device, which may include: a processor and a memory configured to store a computer program executable by the processor. The processor is configured to run the computer program to execute the steps in the information processing method executed by the network device.

The embodiments of the disclosure also provide an electronic device, which may include: a processor and a memory configured to store a computer program executable by the processor. The processor is configured to run the computer program to execute the steps in the information processing method executed by the first terminal device.

The embodiments of the disclosure also provide a network device, which may include: a processor and a memory configured to store a computer program executable by the processor. The processor is configured to run the computer program to execute the steps in the information processing method executed by the network device.

Figure 8:
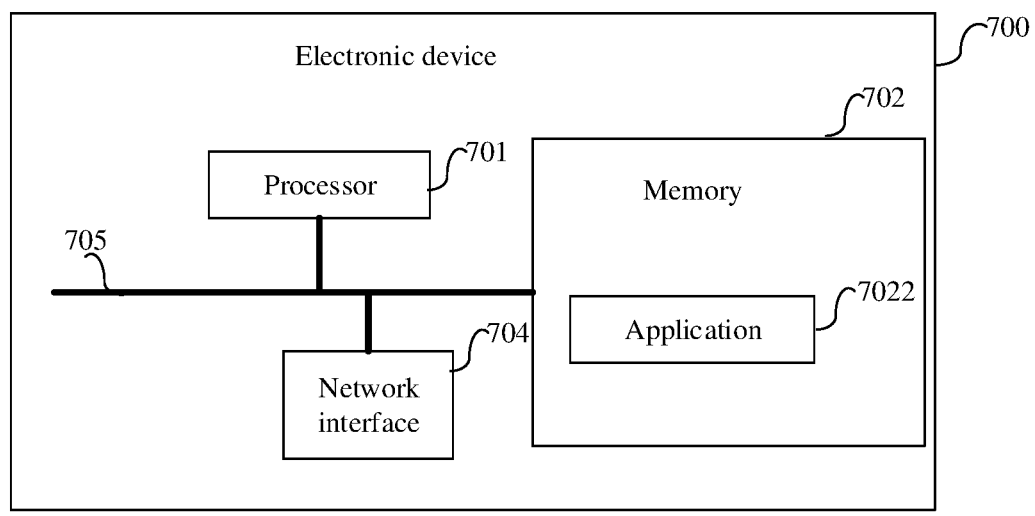
FIG. 8 is a composition structure diagram of hardware of an electronic device according to an embodiment of the disclosure.

FIG. 8 is a composition structure diagram of hardware of an electronic device (the first terminal device or the network device) according to an embodiment of the disclosure. The electronic device 700 includes: at least one processor 701, a memory 702 and at least one network interface 704. All components in the electronic device 700 are coupled together through a bus system 705. It may be understood that the bus system 705 is configured to implement connection communication among these components. The bus system 705 includes a data bus and further includes a power bus, a control bus and a state signal bus. However, for clear description, various buses in FIG. 8 are marked as the bus system 705.

It can be understood that the memory 702 may be a volatile memory or a nonvolatile memory, or may include both the volatile and nonvolatile memories. The nonvolatile memory may be a Read Only Memory (ROM), a Programmable Read-Only Memory (PROM), an Erasable Programmable Read-Only Memory (EPROM), an Electrically Erasable Programmable Read-Only Memory (EEPROM), a Ferromagnetic Random Access Memory (FRAM), a flash memory, a magnetic surface storage, a compact disc, or a Compact Disc Read-Only Memory (CD-ROM). The magnetic surface memory may be a disk memory or a tape memory. The volatile memory may be a Random Access Memory (RAM), and is used as an external high-speed cache. It is exemplarily but unlimitedly described that RAMs in various forms may be adopted, such as a Static Random Access Memory (SRAM), a Synchronous Static Random Access Memory (SSRAM), a Dynamic Random Access Memory (DRAM), a Synchronous Dynamic Random Access Memory (SDRAM), a Double Data Rate Synchronous Dynamic Random Access Memory (DDRS-DRAM), an Enhanced Synchronous Dynamic Random Access Memory (ESDRAM), a SyncLink Dynamic Random Access Memory (SLDRAM) and a Direct Rambus Random Access Memory (DRRAM). The memory 702 described in the embodiment of the disclosure is intended to include, but not limited to, memories of these and any other proper types.

In the embodiment of the disclosure, the memory 702 is configured to store various types of data to support the operation of the electronic device 700. Examples of the data include any computer program, for example, an application 7022, operated in the electronic device 700. A program used for implementing the method of the embodiments of the disclosure may be included in the application 7022.

The method disclosed in the embodiments of the disclosure may be applied to the processor 701 or implemented by the processor 701. The processor 701 may be an integrated circuit chip with a signal processing capability. In an implementation process, the steps of the method may be accomplished by an integrated logic circuit of hardware in the processor 701 or one or more instructions in a software form. The processor 701 may be a universal processor, a Digital Signal Processor (DSP) or another Programmable Logic Device (PLD), a discrete gate or transistor logic device, a discrete hardware component, etc. The processor 701 may implement or execute each method, step and logical block diagram disclosed in the embodiments of the disclosure. The universal processor may be a microprocessor, any conventional processor or the like. The steps of the method disclosed in combination with the embodiments of the disclosure may be directly embodied to be executed and completed by a hardware decoding processor or executed and completed by a combination of hardware and software modules in the decoding processor. The software module may be located in a storage medium, and the storage medium is located in the memory 702. The processor 701 reads information from the memory 702 and completes the steps of the method in combination with hardware.

In an exemplary embodiment, the electronic device 700 may be implemented by one or more Disclosure Specific Integrated Circuits (ASICs), DSPs, PLDs, Complex Programmable Logic Devices (CPLDs), Field Programmable Gate Arrays (FPGAs), universal processors, controllers, Micro Controller Units (MCUs), Microprocessor Units (MPUs), or other electronic components, and is configured to execute the abovementioned method.

An embodiment of the disclosure also provides a storage medium, which is configured to store a computer program.

Optionally, the storage medium may be applied to the terminal device in the embodiments of the disclosure. The computer program enables a computer to execute corresponding flows in each method of the embodiments of the disclosure. For simplicity, elaborations are omitted herein.

Optionally, the storage medium may be applied to the network device in the embodiments of the disclosure. The computer program enables a computer to execute corresponding flows in each method of the embodiments of the disclosure. For simplicity, elaborations are omitted herein.

The disclosure is described with reference to flowcharts and/or block diagrams of the method, device (system) and computer program product according to the embodiments of the disclosure. It is to be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of another programmable data processing device to generate a machine, so that a device for realizing a function specified in one flow or multiple flows in the flowcharts and/or one block or multiple blocks in the block diagrams is generated by the instructions executed through the computer or the processor of the other programmable data processing device.

These computer program instructions may also be stored in a computer-readable memory capable of guiding the computer or the other programmable data processing device to work in a specific manner, so that a product including an instruction apparatus may be generated by the instructions stored in the computer-readable memory, the instruction apparatus realizing the function specified in one flow or multiple flows in the flowcharts and/or one block or multiple blocks in the block diagrams.

These computer program instructions may further be loaded onto the computer or the other programmable data processing device, so that a series of operating steps are executed on the computer or the other programmable data processing device to generate processing implemented by the computer, and steps for realizing the function specified in one flow or multiple flows in the flowcharts and/or one block or multiple blocks in the block diagrams are provided by the instructions executed by the computer or the other programmable data processing device.

The above is only the preferred embodiment of the disclosure and not intended to limit the scope of protection of the disclosure. Any modifications, equivalent replacements, improvements and the like made within the spirit and principle of the disclosure shall fall within the scope of protection of the disclosure.

The invention claimed is:

1. A method for information processing, comprising:
   sending, by a first terminal device, information to a second electronic device; and
   starting, by the first terminal device, a first timer;
   wherein the first terminal device is a terminal device that performs device-to-device (D2D) communication; and the second electronic device is a second terminal device that performs the D2D communication with the first terminal device;
   wherein sending, by the first terminal device, the information to the second electronic device comprises:
   sending, by the first terminal device, a first message to the second terminal device, wherein the first message is used for triggering the second terminal device to send a first parameter combination to the first terminal device; the first parameter combination indicating at least one of a Side Link (SL) data sending parameter of the second terminal device or an SL data receiving parameter of the second terminal device; and
   wherein when the first terminal device receives the first parameter combination sent by the second terminal device, the first timer ends.

2. The method of claim 1, wherein the first message comprises a security parameter configuration message.

3. The method of claim 1, wherein when the first timer has not expired, the first terminal device no longer sends the first message to the second terminal device.

4. The method of claim 1, wherein the first parameter combination comprises at least one of the following:
   a Quality of Service (QOS) attribute, a Provider Service Identifier (PSID), or an Intelligent Transportation System Application-Identifier (ITS-AID).

5. The method of claim 4, wherein when the first parameter combination comprises the QoS attribute, the first parameter combination indicates that the second terminal device requires initiating a service with the QoS attribute.

6. A first terminal device, comprising:
   a processor; and
   a memory for storing a computer program executable by the processor;
   wherein the processor is configured to:
   send, through a network interface, information to a second electronic device and start a first timer,
   wherein the first terminal device is a terminal device that performs device-to-device (D2D) communication; and the second electronic device is a second terminal device that performs the D2D communication with the first terminal device;
   wherein the processor is specifically configured to send, through the network interface, a first message to the second terminal device, the first message being used for triggering the second terminal device to send a first parameter combination to the first terminal device; the first parameter combination indicating at least one of a Side Link (SL) data sending parameter of the second terminal device or an SL data receiving parameter of the second terminal device; and
   wherein when the first terminal device receives the first parameter combination sent by the second terminal device, the first timer ends.

7. The first terminal device of claim 6, wherein the first message comprises a security parameter configuration message.

8. The first terminal device of claim 6, wherein when the first timer has not expired, the first sending unit is configured to no longer send the first message to the second terminal device.

9. The first terminal device of claim 6, wherein the first parameter combination comprises at least one of the following:
   a Quality of Service (QOS) attribute, a Provider Service Identifier (PSID), or an Intelligent Transportation System Application-Identifier (ITS-AID).

10. The first terminal device of claim 9, wherein when the first parameter combination comprises the QoS attribute, the first parameter combination indicates that the second terminal device requires initiating a service with the QoS attribute.

11. A second terminal device, comprising:
    a processor; and
    a memory for storing a computer program executable by the processor;
    wherein the processor is configured to:
    receive, through a network interface, information sent by a first terminal device;
    wherein sending of the information by the first terminal device triggers a first timer to start timing; and
    wherein the first terminal device and the second terminal device are terminal devices that perform device-to-device (D2D) communication;
    wherein the information comprises a first message, the first message being used for triggering the second terminal device to send a first parameter combination to the first terminal device, the first parameter combination indicating at least one of a Side Link (SL) data sending parameter of the second terminal device or an SL data receiving parameter of the second terminal device;
    wherein when the first terminal device receives the first parameter combination sent by the second terminal device, the first timer ends.

12. The second terminal device of claim 11, wherein the first message comprises a security parameter configuration message.

13. The second terminal device of claim 11, wherein the first parameter combination comprises at least one of the following:
- a Quality of Service (QOS) attribute, a Provider Service Identifier (PSID), or an Intelligent Transportation System Application-Identifier (ITS-AID).

14. The second terminal device of claim 13, wherein when the first parameter combination comprises the QoS attribute, the first parameter combination indicates that the second terminal device requires initiating a service with the QoS attribute.

* * * * *